Jan. 12, 1937.                J. W. SMITH                 2,067,464
                                BEARING
                          Filed Nov. 16, 1933
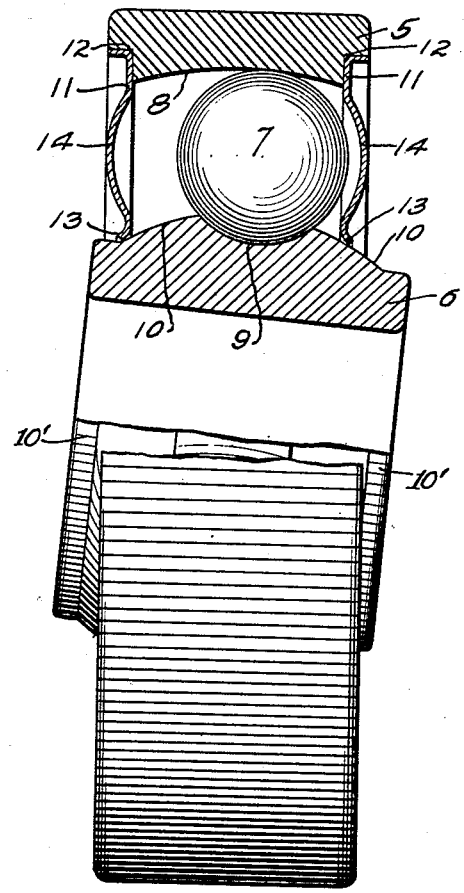
INVENTOR
JOHN W. SMITH
BY
ATTORNEYS Patented Jan. 12, 1937

2,067,464

UNITED STATES PATENT OFFICE 2,067,464

BEARING

John W. Smith, New Britain, Conn., assignor to The Fafnir Bearing Company, New Britain, Conn., a corporation of Connecticut Application November 16, 1933, Serial No. 698,224

13 Claims. (Cl. 308—187)

My invention relates to an anti-friction bearing.

In aeroplanes and other devices, many of the controls and other parts are mounted on ball or other anti-friction bearings. Many of the bearings must be such that the rings, in addition to rotating or oscillating relatively to each other, must also tilt during operation. In other words, the bearing, in order to function properly, must act somewhat in the nature of a universal joint, that is, be a self-aligning bearing. Such bearings are preferably quite tightly sealed and lubricated at the factory so that they require little or no attention or servicing when in use.

It is the principal object of my invention, therefore, to provide a self-aligning bearing, which may be quite tightly sealed at all times, and which will retain lubricant and exclude foreign matter.

In the drawing which shows, for illustrative purposes only, a preferred form of the invention—

The figure is an edge view of a bearing in quarter section, the rings being tilted relatively to each other.

In said drawing, 5 indicates an outer ring, while 6 indicates an inner ring. Anti-friction bearing members, such as balls 7, are interposed between the rings. In order to make the bearing, in effect, self-aligning, the track or groove portion for the balls in one of the rings is made of generally spherical form, as indicated at 8. The center of such sphere is the axial center of the bearing. The other ring, in this case the inner ring 6, is provided with a standard raceway or ball groove 9, which is of only slightly larger radius than the balls 7. With such a bearing it will be clear that the rings may be freely rotated relatively to each other, and, in addition, due to the spherical bearing surface 8 of the outer ring, the two rings may be tilted relatively to each other so that the bearing, in effect, is self-aligning or partakes of the nature of the universal joint.

In order to seal the bearing I provide seal means, preferably in the form of plates, at opposite sides of the anti-friction bearing members, which plates are secured to one of the rings and extend into sealing proximity to a surface on the other ring. Such surface is of generally spherical form.

In the specific embodiment illustrated, the inner ring at each side of the raceway groove 9 is provided with a generally spherical surface 10 except at its end where a stop shoulder 10' is present. The spherical surfaces 8—10 are concentric to permit oscillation of the rings. Seal plates 11—11 are secured to the outer ring 5 in any suitable manner, as by providing undercut grooves 12—12 in edges of the ring 5, into which grooves the seal plates 11—11 may be crimped. The inner edges of the plates extend across the space between the rings and into sealing proximity to the spherical surface 10, as indicated at 13. It will thus be seen that when the rings 5—6 are tilted relatively to each other, the inner edges of the plates 11—11 will remain in constant sealing relation to the spherical surfaces 10 of the inner ring.

The stop shoulders 10'—10' function to limit the permissive degree of oscillation of the rings 5—6 relatively to each other, that limit being reached before the balls 7 can engage the inner surfaces of the seal plates. Seal plates are usually made from thin sheet metal and if the rings were permitted to oscillate or tilt to such a degree that the balls may engage and rub on the inner surfaces of the same, not only would said plates be quickly worn through and their usefulness destroyed, but the free action of the bearing would also be resisted. Destructive wear on the plates would occur very rapidly in very small bearings of the self-aligning type wherein the seal plates are made of very thin metal. In the preferred construction the seal plates may be bulged or bowed in their mid-portion as shown in the drawing so as to provide at each side of the ball space added clearance, which will permit the rings to have an increased degree of oscillation, without allowing the balls to come into contact with the inner surfaces of said seal plates, as compared with the degree of oscillation that would be permitted were the plates made of the customary flat sheet metal. In addition to the foregoing advantages, the bulging of the seal plates produces, in effect, corrugations tending to stiffen the same. Again, it permits both rings 5—6 to be made narrower or shorter than would otherwise be the case without materially restricting the permissive degree of oscillation.

Before the last seal plate is put in place, the bearing may be filled with a suitable lubricant, such as a grease, and when the last seal plate is affixed, the bearing will be complete and will contain or house a sufficient body of lubricant to last generally throughout the normal life of the bearing.

It will thus be seen that I have provided a unitary bearing, which is of the self-aligning type, and which may be permanently sealed so as to exclude foreign matter and contain an adequate supply of lubricant. The bearing may be of the full type, that is, may be completely filled with balls so as to provide maximum capacity for the particular size of bearing.

While the invention has been described in some detail and one preferred form illustrated, it is to be understood that various changes and modifications may be made within the scope of the invention as defined in the appended claims.

I claim:

1. In a self aligning bearing, an outer bearing ring means, an inner bearing ring means, anti-friction bearing members interposed between said inner and outer bearing ring means, and seal means secured to one of said bearing ring means and extending into proximity to a surface on said other bearing ring means, said surface being of generally spherical form whereby said seal means and said surface will remain in sealing relation when said inner and outer ring means are relatively tilted, said other bearing ring means having a shoulder to be engaged by said seal means to limit the relative tilting of said bearing ring means.

2. In a self aligning bearing, an outer bearing ring means, an inner bearing ring means, anti-friction bearing balls interposed between said inner and outer bearing ring means, at least one of said bearing ring means having a generally spherical surface facing said other bearing ring means, and seal means secured to said other bearing ring means and extending into sealing proximity to said generally spherical surface, whereby when said inner and outer bearing ring means are relatively tilted said seal means will remain in sealing proximity to a part of said generally spherical surface, and means to be engaged by said seal means to limit relative tilting of said ring means, said means being independent of said balls.

3. In a self aligning bearing, inner and outer bearing rings having facing concentric generally spherical surfaces, anti-friction bearing members interposed between said rings, and seal means secured to one of said rings and extending across the space between said rings into sealing proximity to the generally spherical surface on the other of said rings, for the purpose described, said ring not carrying said seal means having means to be engaged by said seal means to limit relative tilting of said rings.

4. In a self aligning bearing, an inner bearing ring having a ball raceway groove therein, balls in said groove, an outer bearing ring having a generally spherical surface to engage said balls and permit tilting of said rings, said inner ring at the side of said groove having a generally spherical surface concentric with the spherical surface of said outer ring, and a seal plate secured to said outer ring and extending into sealing proximity to said generally spherical surface on said inner ring, for the purpose described, said inner ring adjacent said spherical surface having a shoulder to be engaged by said seal plate to limit tilting of said bearing rings.

5. In a self aligning bearing, an inner bearing ring having a ball raceway groove therein, balls in said groove, an outer bearing ring having a generally spherical surface to engage said balls and permit tilting of said rings, said inner ring at the side of said groove having a generally spherical surface concentric with the spherical surface of said outer ring, and a seal plate secured to said outer ring and extending into sealing proximity to said generally spherical surface on said inner ring, said seal plate being bowed out to accommodate said balls upon extreme tilting of said rings, said inner ring having a shoulder to be engaged by said seal plate to limit relative tilting of said rings.

6. In a self aligning bearing, an inner bearing ring having a ball raceway groove therein, balls in said groove, an outer bearing ring having a generally spherical surface to engage said balls and permit tilting of said rings, said inner ring at opposite sides of said groove having a generally spherical surface concentric with said spherical surface on said outer ring, said inner ring at opposite sides of said spherical surface having shoulders, and seal plates secured to said outer ring at opposite sides of said balls and extending into sealing proximity to said generally spherical surface on said inner ring and adapted to contact with said shoulders to limit tilting of said rings and avoid contact between said seal plates and balls, whereby the space between said rings may remain sealed during tilting of said rings.

7. In a self-aligning bearing, an outer bearing ring having a relatively broad spherical ball track on its inside side, an inner bearing ring having an annular ball raceway groove on its outer side, bearing balls between said rings, spherical surfaces on the inner ring at the opposite sides of said raceway groove and concentric with the ball track of the outer ring, seal plates carried by the outer ring and overstanding the ball space between said rings, the inner edges of said plates extending into close proximity to the spherical surfaces on the inner ring, with means to limit the permissive oscillation of said bearing rings relatively to each other to such a degree as to prevent said balls from engaging the inner surfaces of said seal plates.

8. In a self-aligning bearing, an outer bearing ring having a relatively broad spherical ball track on its inside side, an inner bearing ring having an annular ball raceway groove on its outer side, bearing balls between said rings, spherical surfaces on the inner ring at the opposite sides of said raceway groove and concentric with the ball track of the outer ring, seal plates carried by the outer ring and overstanding the ball space between said rings, the inner edges of said plates extending into close proximity to the spherical surfaces on the inner ring, with means to limit the permissive oscillation of said bearing rings relatively to each other to such a degree as to prevent said balls from engaging the inner surfaces of said seal plates, said means comprising a stop shoulder at the base of one of the spherical surfaces on the inner bearing ring.

9. In a self-aligning bearing, an outer bearing ring having a relatively broad spherical ball track on its inside side, an inner bearing ring having an annular ball raceway groove on its outer side, bearing balls between said rings, spherical surfaces on the inner ring at the opposite sides of said raceway groove and concentric with the ball track of the outer ring, seal plates carried by the outer ring and overstanding the ball space between said rings, the inner edges of said plates extending into close proximity to the spherical surfaces on the inner ring, with means to limit the permissive oscillation of said bearing rings relatively to each other to such a degree as to prevent said balls from engaging the inner surfaces of said seal plates, said means comprising a stop shoulder at the base of each of the spherical surfaces on the inner bearing ring.

10. In a self-aligning ball bearing, an outer bearing ring having a relatively broad spherical ball track on the inner side thereof, an inner bearing ring having an annular raceway groove therein, bearing balls between said rings, a spherical surface at one side of said raceway concentric with the spherical ball track of the outer ring, a sealing means at that side of said bearing comprising an annular plate secured to the outer ring, the inner margin of said plate extending into close proximity to the spherical surface on the inner ring, the mid-portion of each of said seal plates having an annular outward bulge to provide increased clearance for the bearing balls as the bearing rings are oscillated, and means independent of said balls to limit the degree of oscillation of said rings relatively to each other.

11. In a self-aligning ball bearing, an outer bearing ring having a relatively broad spherical ball track on the inner side thereof, an inner bearing ring having an annular raceway groove therein, bearing balls between said rings, a spherical surface on the inner ring at each side of said ball raceway and concentric with the spherical ball track of the outer ring, sealing means for both sides of the ball space between said rings comprising annular seal plates secured to the outer ring, the inner margins of said seal plates being located in close proximity to the spherical surfaces of the inner ring, the mid-portion of each of said plates having an annular outward bulge to provide additional clearance for the balls as the bearing rings are oscillated relatively to each other, and means independent of said balls to limit the degree of said oscillation.

12. In a self-aligning ball bearing, an outer ring having a ball raceway, an inner ring having a ball raceway, one of said raceways being spherical to form a broad track to permit the bearing rings to be oscillated relatively to each other, the other ring having spherical surfaces on opposite sides of its raceway and concentric with the spherical raceway in the other ring, balls in the space between said rings to hold the same in assembled relation, sealing means substantially covering one end of said ball space between the rings, and comprising a plate secured to and carried by the ring having the spherical ball track, the free edge of said ring extending into close proximity to the spherical surfaces on the other ring, with means to limit the degree of oscillation of one ring relatively to the other to prevent the balls from contacting with the surface of said seal plate.

13. In a self-aligning ball bearing, an outer ring having a ball raceway, an inner ring having a ball raceway, one of said raceways being spherical to form a relatively broad ball track to permit the bearing rings to be oscillated relatively to each other, the other ring having spherical surfaces on opposite sides of its raceway and concentric with the spherical raceway of the other ring, balls in the space between said rings to hold the same in assembled relation, sealing means substantially covering the opposite ends of said ball space between the rings, and comprising plates secured to and carried by the ring having the spherical ball track, the free edge of said ring extending into close proximity to the spherical surfaces of the other ring, the mid-portion of said plate being annularly offset to provide increased clearance at the sides of said bearing to permit said inner ring to be oscillated to an increased degree without permitting said balls to engage the inner surfaces of said seal plate, and means independent of said balls to check the degree of oscillation of said rings.

JOHN W. SMITH.